Patented Oct. 3, 1939

2,174,982

UNITED STATES PATENT OFFICE 2,174,982

PROCESS OF MAKING CEREAL PRODUCTS

John L. Kellogg, Chicago, Ill., assignor to New Foods, Inc., Chicago, Ill., a corporation of Delaware No Drawing. Application November 27, 1936, Serial No. 113,112

4 Claims. (Cl. 99—80)

This invention relates to the manufacture of prepared cereal foods, commonly called breakfast foods, of the flaked or shredded type, particularly; and the object of the invention, generally speaking, is to provide certain improvements in the manufacture of products of this type whereby the flavor, crispness, digestibility and keeping qualities are improved.

The process of the invention is applicable, with some modifications which will be suggested, to the treatment of wheat, rye, corn grits, hulled oats and other cereals.

In the production of prepared cereal foods from wheat and rye particularly, difficulty has been experienced in the matter of flavoring the product with sugar, salt, or other flavoring substance. The flavoring substance does not readily penetrate the grain because of the nature of the cellulose hull of these grains. In the attempt to overcome this difficulty the grains are sometimes cooked until the kernels burst. Even so, the sugar, salt or other flavoring substance, such as malt extract, for example, does not uniformly permeate the material. Salt also tends to bring about a shriveling of the hull when the material is heated with steam.

One of the objects of the present invention is to provide a new and improved process of incorporating sugar, salt or other flavoring material with the cereal so that it will thoroughly permeate the same.

A further object of the invention is to improve the taste, digestibility, crispness and keeping qualities of the cereal by converting the starch in the grains into dextrines or other conversion products. So treated the flaked or shredded product, in addition to being more palatable and digestible will be crisper and remain crisper longer than ordinary flakes or cereals and will better resist the attack of weevils or other insects destructive of cereals.

In carrying out the process, the grain after being washed is treated, in the case of wheat or rye, with caustic alkalies, and is then given a malting or other conversion treatment to dextrinize or partially convert the starches. During the malting step, flavoring substances may be introduced into the material; and following this the material is kept at a temperature of about 148° to 170° Fahrenheit for a long enough time so that the kernels are swelled, and the penetration of the kernels by the flavoring material is assured. The material is then cooked preferably under pressure in a steam cooker but for a shorter time than is usual in making cereal flakes, and is then dried, tempered, preferably treated to add salt to the outside of the grain, and thereafter flaked or shredded and toasted. By cooking is intended heat treatment at temperatures high enough to make the product edible and palatable, for example at temperatures near or preferably above the boiling point of water. By this procedure the flavoring has a chance to penetrate the grain during the relatively low temperature treatment following the malting step so that prolonged cooking at the higher temperature is unnecessary for that purpose. As a result the flakes are crisper and will retain their crispness longer when in contact with milk, cream or other liquid than ordinary cereal flakes. The malting step could be omitted and malt syrup or other flavoring added to the material. The material is ordinarily flaked at a moisture content of about 12–15%. If it is to be shredded, the moisture content is somewhat higher, about 20%.

The following specific examples will illustrate the improvements constituting the present invention. It will be understood that these examples are merely illustrative. The invention is not to be regarded as limited to the specific data given.

*Example 1 for treatment of wheat or rye*

3125 parts of wheat, after being washed, are boiled in 4000 parts of water containing 64 parts of caustic soda. The preferred method is to put the grain in a perforated vessel which is dropped into the boiling lye solution and kept there for about 10 to 20 minutes or until the hull portions of the kernels are partially dissolved. The treatment is not carried far enough so that the alkali affects the starchy portions within the hulls, which will remain hard after the alkali treatment. The grain is then removed from the caustic alkali solution and is washed to remove the alkali and dissolved hulls. The grain could be treated in a cold alkali solution but the operation would require a longer time.

There is then added to the material 187 parts of malt flour and 1500 parts of water. The material is kept at a malting temperature, approximately 148° F. for about thirty minutes to convert the starch into dextrines and other conversion products and then the wort is withdrawn and 187 parts of sugar (cane sugar for example) added thereto. One can also add at this stage 2% of salt (based on the dry substance cereal). The sugar and salt are added to the wort and the wort is then poured over the grain and the mash maintained at about 160° F. for about three hours. At this temperature the grains expand and absorb the flavoring substances. This step of the process gives the flavoring material opportunity to thoroughly and uniformly penetrate the cereal.

The material is then put into a steam cooker and cooked for about 30 minutes to one hour under approximately 15 pounds steam pressure. It is then dried to a moisture content of 12%-15% and is tempered by being kept in a bin until equalization of moisture takes place.

The material is then preferably put into a rotary cooker and 2% of salt added, provided the salt has not been added at the earlier stage of the process. The material is heated under 15-18 pounds steam pressure for fifteen minutes. The material before this treatment may or may not be moistened. If it is to be subsequently shredded, moistening at this stage is desirable. The salt by this operation is deposited on the outside of the grains which is regarded as better than introducing the salt at the conversion step. The material is then flaked or shredded while still hot and then toasted.

*Example 2 for treatment of corn grits or rice*

It is not necessary with these cereals to use the alkali treatment described in connection with the treatment of wheat or rye. The treatment, however, of the corn grits or rice is substantially the same as the treatment of wheat or rye beginning with the malting of the grain.

*Example 3 for production of a cooked oats cereal food*

The oats are hulled and are treated by the process described for the treatment of wheat or rye beginning with the malting step, except that the oats are cooked under steam pressure for a shorter time, preferably for a period of fifteen minutes.

*Example 4 for production of a cereal food of uncooked oats*

The oats are hulled and steeped in water at 158°-170° F. for 15 minutes to one hour to partially convert the starch into dextrine without however cooking the oats. The usual method of making rolled oats involves merely steaming the oats to soften them. According to the present invention the steeping brings about conversion of the starch to some extent at least. After this the oats are dried to about 15-20% moisture and are then flaked.

The term "flaked", as used in the foregoing specification and in the following claims, is intended to include, unless otherwise specified, the obvious equivalents of shredding, rolling, or otherwise treating the cereal to provide suitable shape for the intended purpose.

I claim:
1. Process of making a flaked cereal product which comprises: treating the hulled cereal in water with malt for about thirty minutes to partially convert the starch; then adding a flavoring substance to the wort keeping the material at substantially 148°-170° F. for about three hours until the grain kernels are swelled and the flavoring substance has penetrated the kernels; then cooking the material and flaking it.

2. Process of making a flaked cereal product which comprises: treating the hulled cereal in water with malt to partially convert the starch; adding a flavoring substance to the wort during the conversion operation; keeping the material at substantially 148°-170° F. until the grain kernels are swelled and the flavoring substance has penetrated the kernels; cooking under steam pressure, drying the material, and flaking the material.

3. Process of manufacturing a flaked cereal food which comprises treating the hulled grain in water with malt to partially convert the starch; removing the wort and adding thereto a flavoring substance; pouring the wort and flavoring substance over the cereal and keeping the material at a temperature of about 148° to 170° F. for about three hours to expand the grains and cause the flavoring to be absorbed therein; cooking the material under steam pressure for a relatively short time; drying the material; cooking the material under steam pressure with salt to deposit salt on the outside of the grains; flaking the material while hot; and toasting the flakes.

4. Process of manufacturing a cereal food from grain of the group consisting of wheat and rye which comprises: boiling the grain in a caustic alkali solution to partially dissolve the bran coating of the kernels; washing the material to remove the alkali; treating the material in water with malt to partially convert the starch; adding a flavoring substance to the wort, and keeping the material at 148°-170° F. for three hours to expand the grains and cause the flavoring substance to penetrate them; cooking the material under pressure; and drying and flaking the material.

JOHN L. KELLOGG.